United States Patent [19]
Watson et al.

[11] Patent Number: 5,675,215
[45] Date of Patent: Oct. 7, 1997

[54] COMPACT FLUORESCENT LAMP HAVING A HELICAL LAMP ENVELOPE AND AN EFFICIENT MOUNTING ARRANGEMENT THEREFOR

[75] Inventors: Roy Watson, Pittsfield, Mass.; Jennifer I. Barry, Bay Village; Thomas F. Soules, Richmond Heights, both of Ohio

[73] Assignee: General Electric Company, Schenectady, N.Y.

[21] Appl. No.: 414,458

[22] Filed: Mar. 31, 1995

[51] Int. Cl.$^6$ ............................................. H01J 5/48
[52] U.S. Cl. ................. 313/493; 313/634; 313/318.02; 313/44; 439/227
[58] Field of Search ................... 362/216, 260; 439/227; 313/493, 634, 318.02, 635, 610, 318.04, 44; 315/71, 57

[56] References Cited

U.S. PATENT DOCUMENTS

| | | | |
|---|---|---|---|
| 2,778,462 | 4/1957 | MacFarlane | 313/634 |
| 3,764,844 | 10/1973 | Schmidt | 313/110 |
| 3,886,396 | 5/1975 | Hammer et al. | 313/486 |
| 3,898,495 | 8/1975 | Livera | 313/318.02 |
| 3,953,761 | 4/1976 | Giudice | 315/71 |
| 4,503,360 | 3/1985 | Bedel | 315/112 |
| 4,694,215 | 9/1987 | Hofmann | 313/44 |
| 4,797,594 | 1/1989 | Sigai et al. | 313/488 |
| 5,128,590 | 7/1992 | Holzer | 313/493 |
| 5,150,965 | 9/1992 | Fox | 362/260 |
| 5,220,236 | 6/1993 | Washburn et al. | 313/26 |
| 5,331,168 | 7/1994 | Beaubien et al. | 250/372 |
| 5,341,068 | 8/1994 | Nerone | 315/219 |
| 5,361,017 | 11/1994 | Krause | 315/151 |

FOREIGN PATENT DOCUMENTS

| | | | |
|---|---|---|---|
| 4133077 | 10/1991 | Germany | H01J 61/33 |
| WO9429895 | 12/1994 | WIPO | H01J 5/50 |

*Primary Examiner*—Michael Horabik
*Assistant Examiner*—Michael Day
*Attorney, Agent, or Firm*—George E. Hawranko

[57] ABSTRACT

A compact fluorescent lamp is provided having a generally helically shaped lamp envelope wherein the two end segments of the lamp envelope extend radially inward from the pitch of the helix. The end segment extend into openings formed in a mounting cap member which is essentially dome-shaped at the center portion thereof. The mounting cap member can be constructed of two pieces each of which accepts one of the end segments of the lamp envelope. The mounting cap member is effective for reducing the amount of lamp envelope surface area that must be disposed within the housing of the lamp and is further beneficial in that light generated on the inside surface of the lamp can be reflected outward and more readily escape without losses due to multiple reflections or absorption. The multiple piece arrangement of the mounting cap member is further advantageous in terms of ease of assembly of the overall lamp and in terms of the thermal management properties whereby the heat generated at the end segments of the lamp envelope is substantially prevented from adversely affecting the operation of the lamp.

12 Claims, 2 Drawing Sheets

COMPACT FLUORESCENT LAMP HAVING A HELICAL LAMP ENVELOPE AND AN EFFICIENT MOUNTING ARRANGEMENT THEREFOR

FIELD OF THE INVENTION

This invention relates to a compact fluorescent lamp having a lamp envelope formed essentially in the shape of a double helix and which includes an efficient mounting arrangement for such lamp envelope. More particularly, this invention relates to such a compact fluorescent lamp as achieves an improved efficiency of operation by virtue of a reduction in the amount of lamp envelope area that is disposed within the housing base and further improves the thermal operating characteristics of the lamp in the vicinity of the lamp electrodes by virtue of the separation of the end regions of the lamp envelope.

BACKGROUND OF THE INVENTION

In recent years there has been a tremendous increase in the use of compact fluorescent lamps in place of conventional incandescent lamps. Because of the longer life and the improved energy efficiency of the compact fluorescent lamp over that of the conventional incandescent lamp, consumers as well as commercial establishments have been willing to convert to the compact fluorescent lamps. An example of such a compact fluorescent lamp can be found in U.S. Pat. No. 4,503,360 issued to D. E. Bedel on Mar. 5, 1985. It will be noted that for the typical compact fluorescent lamp, the lamp envelope is shaped in a manner whereby a plurality of parallel extending tube portions extend from a base portion for a predetermined length.

In order to compare favorably to the incandescent lamps, one area that must be addressed by lamp designers is the ability to achieve higher lumen output levels than are presently achieved; for instance, it would be desirable to provide a compact fluorescent lamp that would achieve substantially the same lumen output as a 100 Watt incandescent lamp. A compact fluorescent lamp of sufficiently high power to give the lumen output of a 100 Watt or higher incandescent lamp while running at currents low enough to be very efficient requires a relatively long arc length of greater than approximately 60 cm. To provide a glass tube with such a length that would fit within the small overall size of the conventional incandescent lamp of the same lumen output, lamp manufacturers have gone to extending the lengths of the respective tube portions of the lamp envelope or, in the alternative, to increasing the number of such tube portions to as many as eight such tube portions. As an example of such an application, some compact fluorescent lamps are produced by bending segments of 12 mm tubing into U-shapes and sealing off one or both legs and then connecting two or more of such bent tubes with glass bridges made by simultaneously blowing out a small hole near the bottom of two tubes and fusing them together. The discharge length then passes up one leg, down the other and then through the glass bridge to the second bent tube arrangement and so forth. One problem with such an arrangement is that with the large number of leg portions (up to eight), there is a greater amount of lamp envelope surface area through which light output is expected, that is disposed within the housing top portion for mounting purposes; such light produced in these regions is lost within the top cap portion of the housing.

One approach to solving this problem is to reconfigure the shape of the lamp envelope into a shape that does not require the large number of leg portions to be mounted within the housing and yet still achieves the longer discharge path that is needed to provide the higher lumen output requirements similar to the higher wattage incandescent lamps such as 100 Watts. An example of such a reconfigured lamp envelope shape can be found in the cross-referenced related application Ser. No. 08/414,077, filed 31 Mar. 1995, now abandoned, titled: "Compact Fluorescent Lamp having a Helical Lamp Envelope". In this application, a lamp envelope is provided which is shaped in the form of a double helix having only two end portions which mount within the top portion of the housing assembly.

Other alternate lamp shape arrangements can be provided such as a simple coil mounted horizontally relative to the base and its two legs extending into the base for electrical connection, and, a design wherein the top end of a coiled configuration extends back down through the center of the coil for electrical connection in the base. Such alternate lamp envelope designs can be found in U.S. Pat. Nos. 2,279,635; 3,764,844; and, 5,243,256. With each such alternate lamp envelope design, of ultimate consideration is the fact that such lamp envelope must be fabricated in a manufacturing system and as such, the design must be practical from a cost effectiveness point of view. Accordingly, it would be advantageous to provide a compact fluorescent lamp that could allow for higher lumen output configurations in a lamp envelope configuration that was efficient in terms of allowing light output with minimum absorption and could be implemented on automated high speed manufacturing equipment at a reasonable cost.

One way to form a compact fluorescent lamp having a coiled lamp envelope is to take a straight piece of glass tubing and coil it in the form of a simple coil. An example of such a coiled lamp envelope for a compact fluorescent lamp can be found in German Patent Application No. DE 4133077 filed in Germany on Oct. 2, 1991 and assigned to Narva Berliner Gluhlampenwerk GmbH. In this application, a simple coil arrangement is provided whereby the glass tubing is double wound with an interconnecting bridge portion formed at the top area connecting the two wound coil portions. For the end regions of the lamp envelope, this reference shows such end regions residing on the lamp axis and being formed by bending such bottom portion at an angle away from the coil pitch. By such an arrangement, one skilled in the art would realize that mounting these downward projecting end regions within the housing arrangement will require at least as much space for the two end regions as is utilized for two similar end regions of a conventional U-shaped lamp envelope. Moreover, it can be seen that by projecting the end regions downward, the two end regions reside in a somewhat close relationship to one another thus causing a situation where the heat from each of the electrodes affects the other end region. In a compact fluorescent lamp which utilizes an amalgam for controlling mercury vapor pressure, the thermal management characteristics in the end regions which is where the amalgam material will reside, are of significant importance. By controlling the temperature in this region so as to minimize the heat transfer between the two electrodes, lower temperature amalgam materials can be utilized, such amalgams as are more readily obtainable than those which must operate at higher temperatures. For the previously referenced German Patent Application, though the overall effect of the use of a coil configuration for the lamp envelope as shown is to achieve greater efficiency as compared to a compact fluorescent lamp that utilizes a U-shaped envelope, there are deficiencies in this coil design in terms of the end region design and the ability to mount the lamp envelope in a housing arrangement in an efficient manner.

Accordingly, it would be advantageous to develop a lamp envelope that provided for end regions that could be easily mounted within the housing arrangement so as to minimize the amount of light lost within the housing arrangement and further, could be disposed relative to one another so as to provide an efficient thermal management arrangement thereby allowing the use of readily available amalgam materials for mercury vapor pressure control. Additionally, it would be further advantageous if a mounting arrangement associated with the housing, could be developed that, in conjunction with the lamp envelope end region configuration, would work to minimize the light lost within the top portion of the housing as well as serve to maintain heat separation of the electrodes disposed within such end regions. Finally, it would be further advantageous if such mounting arrangement for the end regions could be constructed in a way so as to more efficiently facilitate the manufacturing operation of assembling the lamp envelope and housing configuration into a final product.

SUMMARY OF THE INVENTION

The present invention provides a low pressure discharge lamp that includes a lamp envelope shaped as a double helix so as to result in a discharge path capable of yielding lumen outputs that are equivalent to those of a comparable higher wattage incandescent lamp. This lamp envelope configuration provides for end segments that are angled relative to the lamp axis and which fit within slotted sections of a mounting cap in a manner that minimizes the amount of light lost through the mounting arrangement and further allows for the separation of the respective end segments so as to achieve an improved thermal operating arrangement for the discharge lamp.

In accordance with the principles of the present invention, there is provided a low pressure discharge lamp that includes a tubular lamp envelope configured in a coiled arrangement and having a first and a second end associated therewith. The lamp envelope has a phosphor coating on the interior thereof and further contains a gas fill that is energizable to a discharge state. A mounting cap member has openings formed therein which are receptive of the end segments of the lamp envelope and allow for securing and electrically connecting the lamp envelope to a source of energy for enabling the discharge. The openings are formed in the mounting cap at an angle to conform to the angle at which the end segments of the lamp envelope are formed thus minimizing the portion of such end segments that must reside within the mounting cap and thereby minimizing the amount of light lost from these end regions by the mounting arrangement. The mounting cap can also be formed in a dome shaped manner so as to allow for less light being lost within the region of the mounting cap.

BRIEF DESCRIPTION OF THE DRAWINGS

In the following detailed description, reference will be made to the drawings in which.

DETAILED DESCRIPTION OF THE INVENTION

Figure 1:
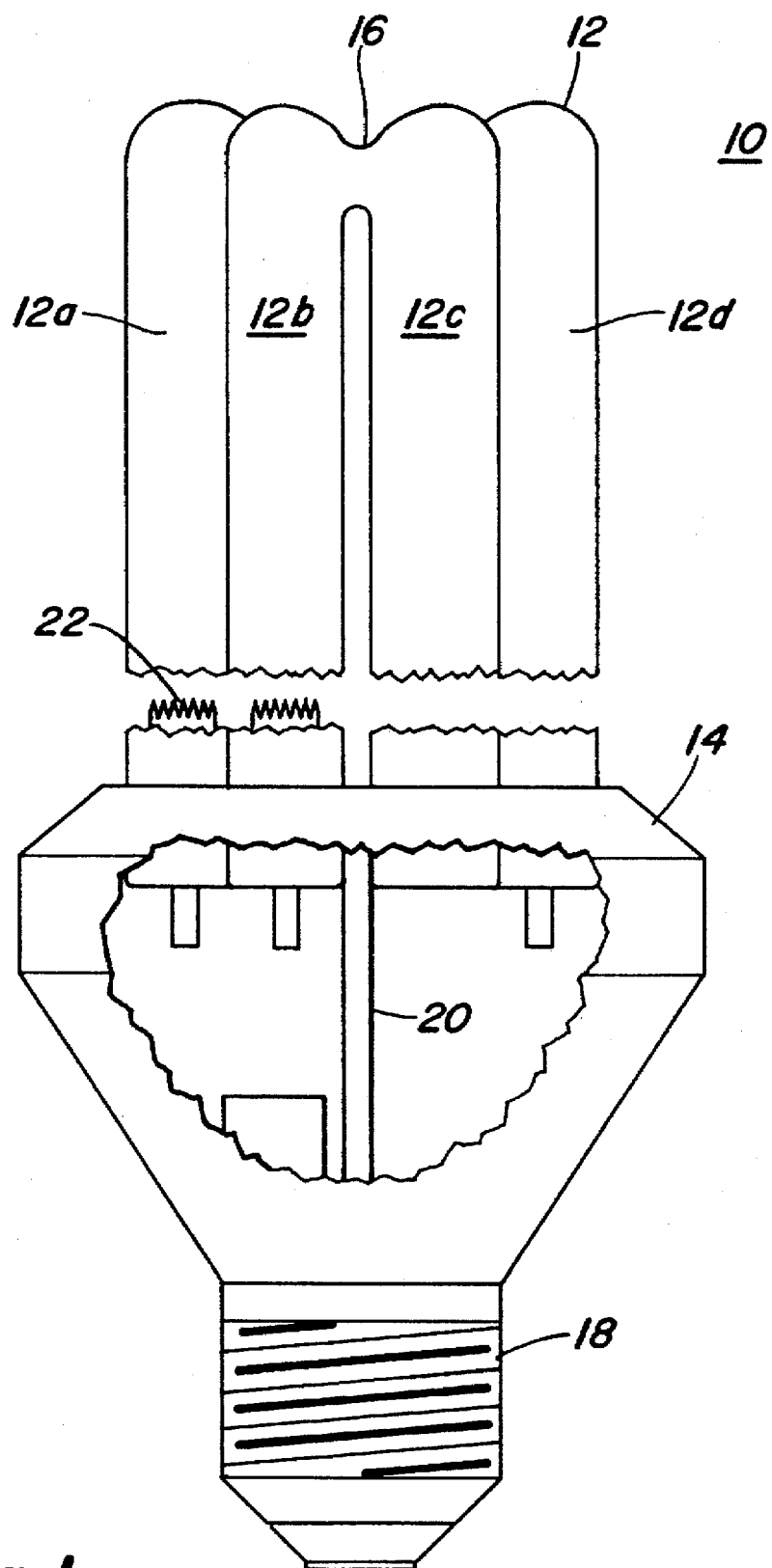
FIG. 1 is an elevational view in section of a compact fluorescent lamp constructed according to the prior art.

As seen in FIG. 1, a compact fluorescent lamp 10 constructed in accordance with the teachings of the prior art, includes a lamp envelope configuration 12 with a plurality of extension tubes 12a, 12b, 12c and 12d, each of which extend upward from a housing 14 in a parallel manner to one another. Though illustrated as including four extension tubes, the lamp envelope configuration 12 of FIG. 1 can include either six or eight such extension tubes each of which would be disposed along the outer periphery of the top portion of the housing 14. In conventional practice, the extension tubes 12a, 12b, 12c and 12d are joined together in pairs and are essentially U-shaped with a junction 16 formed at the top of each pair. Additionally, a bridge connection (not shown) is formed at the bottom portion of each pair of extension tubes so as to connect the plurality of extension tubes in a continuous discharge path. A threaded screw base 18 is mounted on the bottom portion of the housing 14 to allow for use of the compact fluorescent lamp 10 in conventional light sockets (not shown). Also illustrated in FIG. 1 is a ballast circuit arrangement 20 which is mounted within the housing 14 and which is effective for receiving line power through the screw base 18 and converting the line power into an operating signal which is connected to electrodes 22 for driving the discharge. The discharge occurs within the lamp envelope 12 in a standard manner whereby a fill of mercury and a noble gas is excited to a discharge state by introduction of the operating signal generated by the ballast circuit arrangement 20. A phosphor coating (not shown) disposed on the inner surface of the lamp envelope is effective for converting the discharge into visible light as is well known in the art.

It should be noted that in order to achieve the higher lumen output configurations similar to those of conventional incandescent lamps that the compact fluorescent lamp is intended to replace, it is necessary to increase the discharge path within the lamp envelope to a length of greater than approximately 60 cm. By use of the parallel extension tubes 12a, 12b, 12c, and 12d (and as many as eight) of the prior art, there is a decrease in efficiency in that a greater number of extension tube end portions are disposed within the top portion of the housing 14 and therefore the light generated thereby is lost. Additionally, since there is a limit to the length of each extension tube as dictated by the size of the lighting fixtures in which the compact fluorescent lamp is intended for use, it is necessary to provide a larger number of extension tubes around the outer periphery of the top portion of the housing member 14. By crowding more extension tubes around the outer periphery of the top portion of the housing member 14, it can be appreciated that, with respect to light generated at the back portions of each extension tube, such light must bounce off of the backs of other extension tubes and a significant amount of light is thereby lost. In other words, only light generated at the outwardly facing portions of the extension tubes is distributed without reflecting off of numerous other surfaces as is the case of light generated on the back sides of each of such extension tubes.

It should be further noted that by placing more extension tubes along the outer periphery of the top portion of the housing member 14, a greater space is created at the top portion of the lamp envelope 12, a space in which there is no light output provided. If one were to utilize the compact fluorescent lamp 10 of the prior art in a lighting fixture designed for downlighting or for a reading light application, it is important to have light radiating from the top of the lamp similar to the manner of a conventional A-line incandescent lamp. The dead space of the lamp 10 also suffers from the disadvantage of experiencing the phenomenon of "flash" which can occur in a deep specularly reflecting light fixture where the "flash" is a term defining the observation of the reflection of the lamp in the fixture when one is looking at the ceiling. Flash is objectionable if the lamp image changes rapidly from light to dark as one walks under the lamp thereby drawing attention to the light source.

Figure 2:
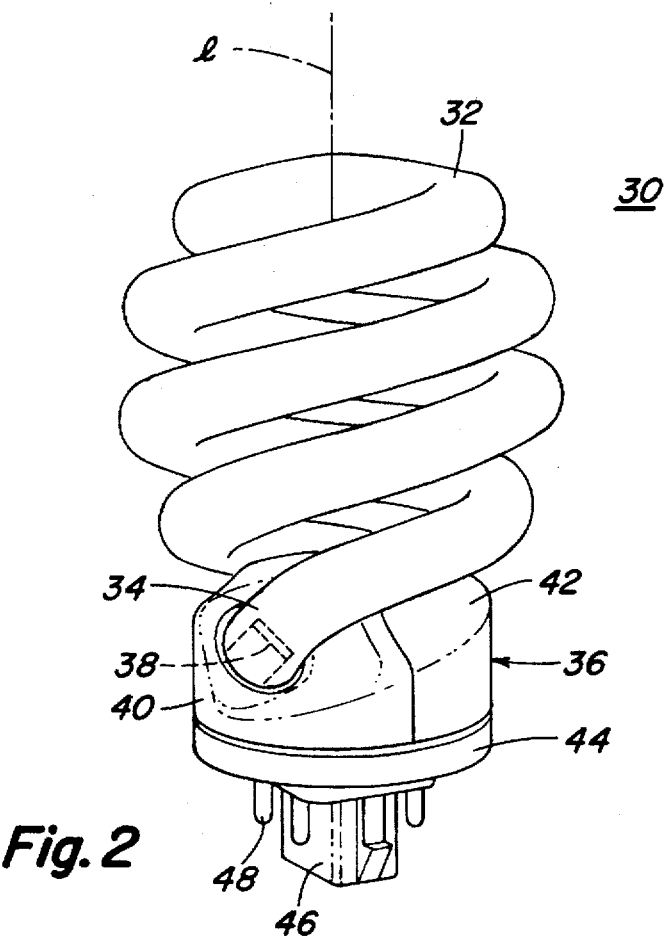
FIG. 2 is an elevational view in section of a lamp envelope and mounting cap arrangement constructed in accordance with the present invention.

As seen in FIG. 2, a compact fluorescent lamp 30 which avoids the aforementioned problems of prior art compact fluorescent lamps, includes a lamp envelope 32 which is shaped in the form of a double helix about an axis "1". The lamp envelope 32 has respective first and second end segments 34 which are shown as being mounted within a mounting cap member 36. Disposed within the end segments 34 of the lamp envelope 32 are electrodes 38. The electrodes 38 are sealed within the end segments 34 in a conventional manner and are effective for providing the energy to cause the discharge within the lamp envelope 32. The lamp envelope 32 is internally coated with a phosphor material and contains a fill of mercury and a noble gas both features of which are well known in the fluorescent lamp art.

The mounting cap member 36 into which the end segments 34 of lamp envelope 32 fit, is shown as comprising two top half portions 40 and 42 as well as a bottom plate portion 44. Extending from the bottom plate portion 44 is a keyed mounting post 46 which is used to align and mount the lamp and mounting cap arrangement 30, 36 of FIG. 2 into an adaptor base configuration which is known in the art. Pin members 48 also extend from the bottom of the bottom plate portion 44 to allow for electrical connection to the electrode members 38. Of course, it should be understood that mounting the lamp envelope and mounting cap member 30, 36 in an adaptor base assembly is but one example of an application of the present invention, it is contemplated that other configurations are within the scope of the present invention as well, for instance, the lamp and mounting cap arrangement 30, 36 could be mounted on an integral housing and ballast arrangement similar to the prior art arrangement of FIG. 1.

Referring now to the design of the upper portion of the mounting cap member 36, it can be seen that the two portions 40 and 42 fit together in a manner to achieve an essentially dome-shaped middle or interior portion. There are two ridges 50, 52, each formed on one side of the two cap member portions 40, 42, and each ridge extends into respective first and second openings 54, 56 only one of which is shown in the figure. The openings 54, 56 are formed to extend into the mounting cap member at approximately the same angle that the end segments 34 of the lamp are formed, such angle being approximately between 20 and 40 degrees. The openings 54, 56 are also sized so as to closely correspond to the diameter of the lamp envelope 32 thereby providing a close fit between the lamp envelope 32 and the mounting cap member 36. In this manner, given the close fit between the lamp envelope 32 and the mounting cap member 36 as well as the snap fit arrangement of the mounting cap member 36, it would be possible to assemble the discharge lamp 30 without the use of adhesives.

In terms of appearance, each ridge 50, 52 formed in the two respective pieces of the mounting cap member gently rises up to the dome as a concave sculpted shelf that essentially follows the contour of the helix of the lamp envelope 32. In this manner, the mounting cap member 36 is round like the lamp envelope 32 and by virtue of the rising slope of the ridges 50, 52, follows the slope of the helical lamp envelope so as to achieve a unified structure between the lamp and the base arrangement 30, 36. Though aesthetically pleasing, the purpose of the dome-shaped mounting cap member 36 is also functional in that it provides an optical advantage over other top cap configuration that are essentially flat. This optical advantage is achieved by the fact that light generated on the inside of the helical lamp is directed downward toward the mounting cap member 36 and can be reflected out through the ridge areas 50, 52 without being trapped or otherwise lost by absorption.

The two piece arrangement of the mounting cap member 36 is further advantageous in terms of the thermal operating characteristics of the lamp 30. By use of a separate mounting cap member 36, the heat generated by the electrodes 38 is kept well away from the housing base in which the ballast circuit arrangement is typically disposed thus allowing the electronic or magnetic elements to run unaffected by the thermal characteristics of the discharge. Additionally, the mounting cap member can be made of a plastic material that has a higher thermal capability than would be necessary for the housing base 58 as shown in the following FIG. 3. Yet another thermal advantage to the two piece arrangement of the mounting cap member 36 is realized by the fact that the end segments 34 of the lamp envelope are compartmentalized; that is, they are kept separate from one another thereby decreasing the amount of heat generated from one electrode from affecting the other electrode. This is significant since the end segments 34 or an exhaust tip, is generally used to contain an amalgam which controls the mercury vapor pressure in the lamp envelope 32. Existing standard amalgam materials (i.e. lead, bismuth, indium) provide the appropriate mercury vapor pressure at temperatures ranging between 80 and 100 degrees Celsius; at higher temperatures, it is more difficult to determine suitable amalgam materials.

Figure 3:
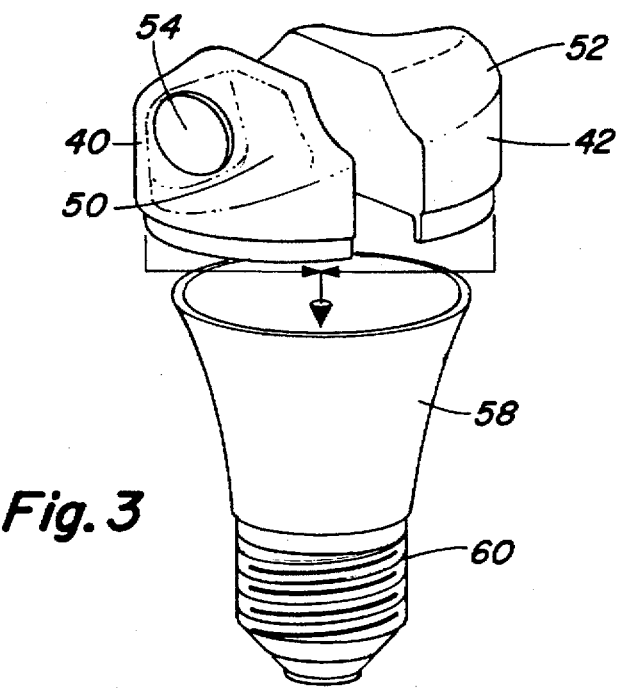
FIG. 3 is an elevational view in section of a base housing and mounting cap arrangement constructed in accordance with the present invention.

As seen in FIG. 3, the mounting cap member 36 can be cut into two pieces 40, 42 thereby making assembly substantially easier. Specifically, by providing the two pieces 40, 42 shown, each piece can be slipped over one of the end segments 34 of the lamp envelope 32, then snapped together and further locked into either the bottom plate portion 44 as shown in FIG. 2, or alternatively, into a housing member 58 as shown in FIG. 3. The housing member can include therein, a ballast circuit arrangement and can further have mounted thereon, a screw base for insertion of the discharge lamp 30 into a conventional light socket (not shown).

Although the hereinabove described embodiments constitute the preferred embodiments of the invention, modifications can be made thereto without departing from the scope of the invention as set forth in the appended claims. For instance, it would be possible to alter the angle at which the end segments of the lamp enter the mounting cap arrangement, such a modification would still be within the scope of the present invention. Additionally, it would be possible to provide the mounting cap arrangement in a greater number of pieces or in other out-away configurations, and yet still obtain the advantages relative to the optical and heat benefits of the illustrated mounting cap; such modifications are also contemplated as being within the scope of the present invention. One such alternate cut-away configuration would be to have the two pieces separated horizontally with the slice occurring so that the lamp end segments could be cemented into the bottom portion and then a top portion either snapped or glued into place.

We claim:

1. A low pressure discharge lamp comprising:
   a tubular lamp envelope coiled about an axis having first and second end segments associated therewith, said lamp envelope having an interior surface on which a phosphor coating is applied and further containing therein a gas fill energizable to a discharge state;

a mounting cap member having first and second openings formed therein for receiving at least a portion of said first and second end segments, respectively, such that the portion of each of said end segments fits within said respective opening so as to be covered by said mounting cap member; and, wherein said first and second end segments of said lamp envelope are formed at an angle between approximately 20° and approximately 40° relative to the axis and said openings are structured to conform to such angle so as to minimize said portion of said first and second end segments as are covered by said mounting cap member.

2. A discharge lamp as set forth in claim 1 wherein said mounting cap member is essentially dome-shaped having a center raised portion around which at least a portion of said end segments of said lamp envelope extend.

3. A discharge lamp as set forth in claim 2 wherein said mounting cap member is formed of two pieces each having one of said openings formed therein corresponding to said first and second end segments of said lamp envelope.

4. A discharge lamp as set forth in claim 1 wherein said mounting cap member is formed of two pieces each having one of said openings formed therein corresponding to said first and second end segments of said lamp envelope.

5. A discharge lamp as set forth in claim 1 wherein said tubular lamp envelope includes only said first and said second end segments.

6. A discharge lamp as set forth in claim 1 wherein said openings are formed in said mounting cap member at opposite ends from one another so as to thermally separate said first and second end segments of said lamp envelope from one another.

7. A discharge lamp as set forth in claim 1 wherein said mounting cap member has a ridge formed on a lower region thereof, said ridge being effective so as to enable fitting said mounting cap member onto a housing member, said housing member having a screw base disposed thereon so as to enable connection to electrical power for energizing said gas fill to such discharge state.

8. A discharge lamp as set forth in claim 7 further comprising a ballast circuit arrangement disposed within said housing member and being effective so as to receive line power and convert such line power into an operating signal effective for driving said gas fill to such discharge state.

9. A low pressure discharge lamp comprising;

a coiled tubular lamp envelope configured about an axis in the shape of a double helix having first and second end segments associated therewith and having a phosphor coating applied internally thereof and further containing a gas fill energizable to a discharge state;

first and second electrode members disposed in said first and second end segments of said lamp envelope;

a mounting cap member having openings formed therein, said openings being sized so as to accept said first and second end segments of said lamp envelope in a close fitting manner; and, wherein said first and second end segments are formed at an angle between approximately 20° and approximately 40° relative to the axis and said openings are formed in said mounting cap member at opposite ends from one another so that said first and second end segments of said lamp envelope are thermally separated from one another.

10. A discharge lamp as set forth in claim 9 wherein said mounting cap member is essentially dome-shaped having a center raised portion around which at least a portion of said end segments of said lamp envelope extend.

11. A discharge lamp as set forth in claim 9 wherein said mounting cap member is formed of two pieces each having one of said openings formed therein corresponding to said first and second end segments of said lamp envelope.

12. A discharge lamp as set forth in claim 9 wherein said respective first and second end segments are angled differently than the pitch associated with such double helix configuration of said lamp envelope.

* * * * *